May 26, 1970　　　　　　　B. SOROKA　　　　　　3,513,686
PROXIMITY GAGE TESTING DEVICE AND CALIBRATOR
Filed April 3, 1968

INVENTOR,
Bernard Soroka

BY: Harry M. Saragovitz,
    Edward J. Kelly &
    R. P. Gibson          ATTORNEYS.

United States Patent Office 3,513,686
Patented May 26, 1970

3,513,686
PROXIMITY GAGE TESTING DEVICE AND CALIBRATOR
Bernard Soroka, Baltimore, Md., assignor to the United States of America as represented by the Secretary of the Army
Filed Apr. 3, 1968, Ser. No. 718,520
Int. Cl. G01c 25/00
U.S. Cl. 73—1
9 Claims

ABSTRACT OF THE DISCLOSURE

To test or calibrate a proximity gage a flat plate is brought into proximity with the gage at a selected distance therefrom. The plate is quickly brought to two predetermined positions relative to the gage as determined by adjustable stops on a slidable stem. One plate may be large enough to span two or more gages, or several gages may be inserted for simultaneous or alternate testing or calibration.

The invention described herein may be manufactured, used, and licensed by or for the Government for governmental purposes without the payment to me of any royalty thereon.

BRIEF SUMMARY

An electrical proximity gage is usable to determine or record the distance to a given object, or to make a recording as an object moves relative to the gage. These gages must be tested and calibrated for operativeness and accuracy. The testing and calibration can be accomplished by placing the gage in a fixed position and bringing an object into proximity therewith, at a predetermined distance therefrom, and taking a reading from the gage. The object may then be moved to one or more additional predetermined positions for additional readings for determination of operativeness, accuracy and calibration of the gage.

The testing equipment obviously is more valuable if it is simple, accurate and inexpensive, and easy and fast to use. This reduces expensive manpower requirements and enables employment of semi-skilled workers, leaving professional manpower available for necessary highly skilled work.

The present apparatus is simple, accurate, inexpensive and easy and fast to use by semi-skilled workers.

DETAILED DESCRIPTION

Figure 1:
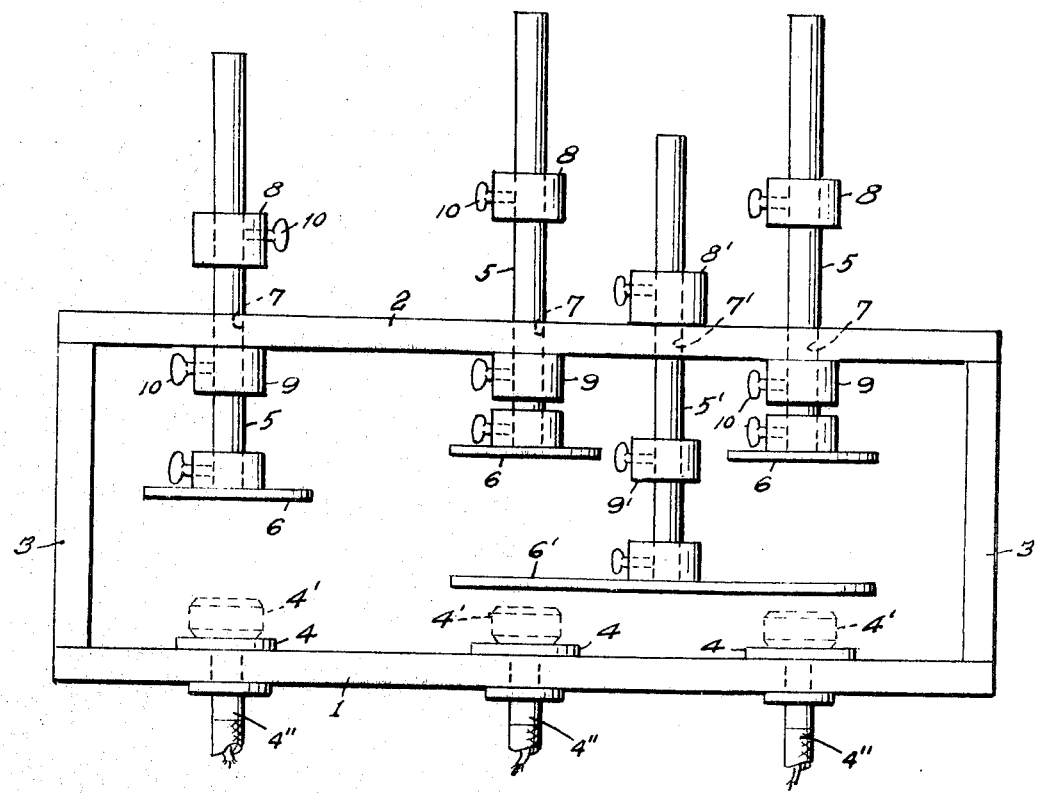
FIG. 1 is a side view of an embodiment of the invention.

A first base member 1 and a second base member 2 are held in substantially parallel relationship by spacers 3. Gage mounts 4 and stems 4" on base member 1 permit rapid attachment and removal of gages 4'. Stems 5 are provided with plates 6 and are slidable in apertures 7. First adjustable stop means 8 limit movement of said stems in one direction and second adjustable stop means 9 limit movement of said stems in the opposite direction. Thumb screws 10 permit quick adjustment and securing of the adjustable stops on the stems. Thumb screws (not shown) could be provided to secure stems 5 and 5' to base member 2, in any position desired, while readings are taken or while one or more stems are not in use.

Stem 5' carries a large plate 6', preferably oblong or of a "figure 8" design. It is adjustable as permitted by stops 8' and 9'. This large plate extends across or into the area of a plurality of gages simultaneously. If not in use it may be removed, or rotated 90° to a position such that its narrow waist area permits plates 6 to be moved therebelow without removal of plates 6 or 6'.

Figure 2:
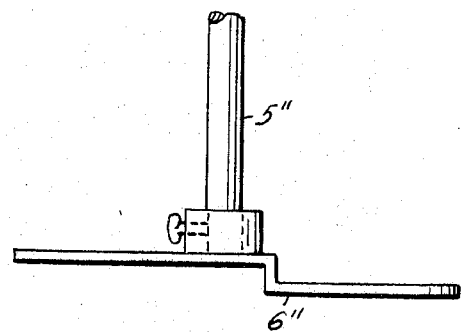
FIG. 2 is a view of a modification.

In the modification of FIG. 2, plate 6", carried on stem 5", has one area lowered relative to another area. This permits simultaneous testing of two, or more, gages where different spacings between the gages and plate are desired. Or, one set of readings can be taken and the plate is then rotated on its axis for a different set of readings.

OPERATION

The operator places a proximity gage 4' to be tested on a gage mount 4 with stem4' in first base member 1. This gage may be placed into position in a split-second. Plate 6 is at a preselected distance from the gage, as determined by the setting of adjustable stop 8. If the proximity gage is functioning its electrical readout immediately shows the gage is "good." A reading is taken. The magnitude of the readout is proportional to the distance between the gage and the plate. Therefore, the gage can be quickly calibrated to indicate the measured distance between the gage and plate, or the "strength" of the gage as compared with a "standard." Then in a split-second, plate 6 is moved to a position farther away from gage 4' as limited by stop 9. Another reading is taken for another check on the gage's output and the test and calibration are thus completed within a few seconds.

For still faster operation a plurailty of gages and plates can be tested and/or calibrated. Each plate can be differently set, by stops 8 and 9. Or, a plurality of gages can be identically tested simultaneously by use of plate 6'.

As illustrated in FIG. 2, plate 6" may have a plate portion closer to one gage than the other. This makes it possible to simultaneously test sets of two or more gages where one plate portion is closer to one gage than the other plate portion is to another gage. Or, the plate may be rotated about the axis of stem 5" to bring the raised and lowered plate portions alternately adjacent to one or more gages to be tested or calibrated for successive testing thereof.

Obviously more than two gages may be tested simultaneously or alternately by use of large plates as at 6' or 6". Or, such plates may be swung to an inoperative position for use of individual plates 6.

I claim:

1. Apparatus for calibrating gages comprising a first base member, a second base member, spacer means holding said base members substantially parallel with each other, a gage mount on said first base member for rapid attachment and removal of a gage to be calibrated, a stem with a plate thereon, an aperture in said second base member for receiving said stem, first adjustable stop means on said stem to limit movement of said stem in one direction, second adjustable stop means on said stem to limit movement of said stem in the opposite direction, means for adjustment of said stop means, said first adjustable stop means limiting movement of said stem and plate to a location approaching the gage to be calibrated and said second adjustable stop means limiting movement of said stem and plate to a location remote from the gage.

2. Apparatus as in claim 1 wherein there are a plurality of gage mounts on said first base member for attachment of a plurality of gages to be calibrated and wherein said plate extends into the area of a plurality of gages to permit calibration of a plurality of gages simultaneously.

3. Apparatus as in claim 1 wherein there are a plurality of gage mounts on said first base member for attachment of a plurality of gages to be calibrated and wherein a plurality of apertures in said second base member receive a plurality of stems carrying a plurality of plates substantially in axial alignment with the gages to permit calibration of a plurality of gages simultaneously or alternately.

4. Apparatus as in claim 1 wherein there are a plurality of gage mounts on said first base member for attachment of a plurality of gages to be calibrated and wherein a plurality of apertures in said second base member receive a plurality of stems carrying a plurality of plates, at least one of said plates being substantially in axial alignment with a gage and at least one of said plates extending into an area of a plurality of gages to permit calibration of one gage, or a plurality of gages simultaneously, or alternate calibration of one or a plurality of gages.

5. Apparatus as in claim 1 wherein said stem supports a large plate extending into an area adjacent to a plurality of gages.

6. Apparatus as in claim 5 wherein said plate has a portion extending closer to one gage than another portion extends toward another gage.

7. Apparatus as in claim 6 wherein said plate is rotatable about its axis to bring the varying portions into different positions relative to one gage.

8. An apparatus for calibrating gages comprising a first base member element and a second base member element parallel thereto, means positioning a gage mount element on one of said base member elements, means positioning a plate element on said other base member element, and means positioning said base member elements in their parallel relationship, one of said positioning means being adjustable to permit relative movement of the elements supported thereby normal to said plate element, first adjustable stop means mounted on said one movable positioning means to limit movement of the element supported thereby in one direction and second adjustable stop means mounted on said one movable positioning means to limit movement of said last mentioned element in the opposite direction whereby the gage mount element and plate element may be positioned at various distances with respect to each other.

9. An apparatus for calibrating gages according to claim 8 in which the first and second adjustable stop means are located on a positioning means that comprises a stem movable through one of said base members.

References Cited

UNITED STATES PATENTS

| | | |
|---|---|---|
| 2,741,846 | 4/1956 | Shuttleworth. |
| 2,837,828 | 6/1958 | Cybulski. |
| 3,143,809 | 8/1964 | Parker. |
| 3,183,599 | 5/1965 | Byrd et al. |
| 3,296,704 | 1/1967 | Zajkowski. |

S. CLEMENT SWISHER, Primary Examiner

H. C. POST III, Assistant Examiner